J. R. ADAMS.
WATER-CLOSET.
No. 194,982. Patented Sept. 11, 1877.
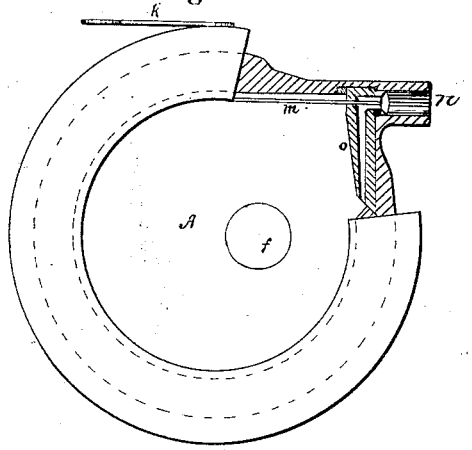
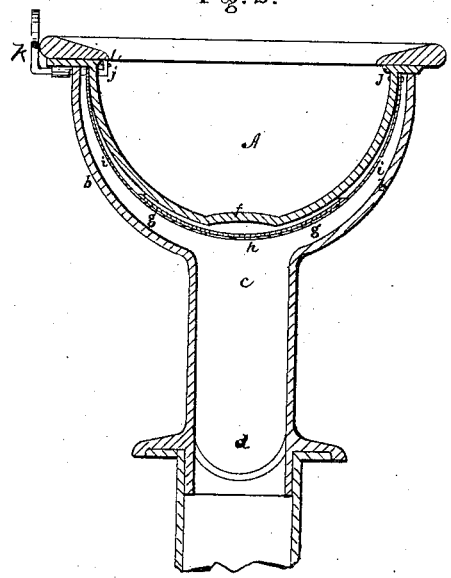
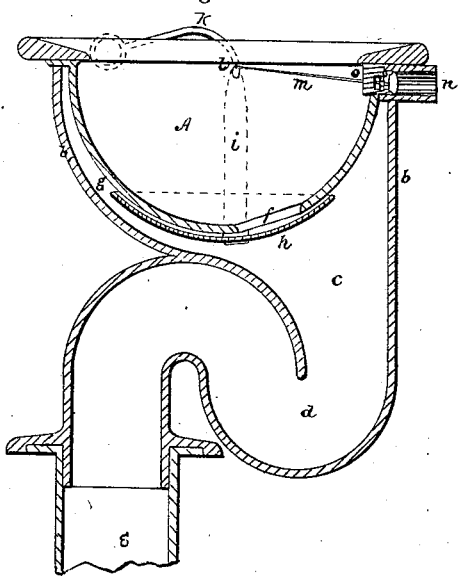
Witnesses
Geo. H. Strong
Jno. L. Boone
Inventor
John R. Adams
by Dewey & Co.
Attys.

UNITED STATES PATENT OFFICE.

JOHN R. ADAMS, OF OAKLAND, CALIFORNIA.

IMPROVEMENT IN WATER-CLOSETS.

Specification forming part of Letters Patent No. 194,982, dated September 11, 1877; application filed July 19, 1877.

*To all whom it may concern:*

Be it known that I, JOHN R. ADAMS, of Oakland, county of Alameda, and State of California, have invented an Improved Water-Closet; and I do hereby declare the following to be a full, clear, and exact description thereof, reference being had to the accompanying drawings.

My invention relates to certain improvements in water-closets; and it consists, mainly, in a novel method of hanging and operating the pan, so that I do away with the space usually needed for the operation of the pan, and make the apparatus more compact.

It also relates to a method for leading all waste water from leakage into the pan.

In the accompanying drawings, Figure 1 is a sectional elevation of my device, taken through $xx$. Fig. 2 is a section taken through $yy$. Fig. 3 is a horizontal section through $zz$.

A is the bowl of my water-closet, which is supported within the outer chamber $b$. This chamber has the discharge-opening $c$ made at the rear, and directly above the stench-trap $d$. $e$ is the exit-pipe.

The opening $f$ of the bowl is made well to the rear, and above the opening $c$, so as to effect a direct discharge with as few turns and obstructions as possible.

A space, $g$, is left between the outer chamber $b$ and the bowl, and the pan $h$ is supported beneath the opening of the bowl in such a manner that it may be moved in a curved line around and behind the bowl, so as to discharge its contents and expose the discharge-opening below. This is effected by suspending the pan by two arms, $i$, one upon each side of the bowl, and inside the space between the chamber $b$ and the bowl. These arms are secured rigidly to the sides of the bowl and to axes $j$ at either side of the top, these axes being so situated with reference to the shape of the bowl, outer chamber, and intervening open space that when the pan swings about them it will pass up into this open space, which is made wide enough to admit it.

A comparatively narrow space is needed for the operation of the pan, because the bowl and outer chamber are formed upon a curve corresponding with that of which the axes $j$ are the center.

The pan is operated by a lever, $k$, secured to the outer end of one of the axes, as shown, and the weight of the pan always returns it to its proper position after the lever is released.

An arm, $l$, is secured to the inner end of one of the axes, and a rod, $m$, extends backward to a valve in the water-pipe $n$, so that when the lever $k$ is moved to discharge the contents of the pan this rod will also be operated, and open the water-valve to flood and wash down the bowl.

The conveyer $o$, which leads the water from the pipe to the point of discharge at the rear of the bowl, is formed, as shown, with a projecting tube, $p$, which enters the mouth of the water-pipe $n$, and is packed or otherwise fitted to make a tight joint. The conveyer fits into a recess made for it in the back of the bowl, and, as there is no communication with the exterior, it will be seen that any leakage through the valve will pass directly into the bowl, with no chance to get out and cause damage.

By my method of operating the pan I am enabled to make the outer chamber very compact and symmetrical, as there is no necessity for a large extra chamber for the pan to swing into, as is the case when they are hinged at one side, and the operating devices are simplified.

Having thus described my invention, what I claim, and desire to secure by Letters Patent, is—

1. The combination of the outer chamber $b$ and bowl $a$ of a water-closet, set concentrically with each other, and having a space between them and the pan $h$, arranged to swing into this space to discharge itself, substantially as herein described.

2. The pan $h$ of a water-closet, suspended by arms $i$ from axes $j$, said axes being nearly, or quite, the center of formation of the outer chamber and bowl, and the operating-lever $k$, substantially as herein described.

3. In combination with the pan $h$, suspended as shown, and the operating-lever $k$, the arm $l$, valve-rod $m$, to operate a valve in the pipe $n$ and admit water, substantially as herein described.

4. The conveyer $o$, with its projecting tube $p$ fitting the water-pipe $n$, as shown, said conveyer lying within the bowl, so as to prevent external leakage, substantially as herein described.

In witness whereof I have hereunto set my hand and seal.

JOHN R. ADAMS. [L. S.]

Witnesses:
OLWYN T. STACY,
FRANK A. BROOKS.